(12) United States Patent
Yu et al.

(10) Patent No.: US 10,802,992 B2
(45) Date of Patent: Oct. 13, 2020

(54) COMBINING CPU AND SPECIAL ACCELERATOR FOR IMPLEMENTING AN ARTIFICIAL NEURAL NETWORK

(71) Applicant: Deephi Technology Co., Ltd., Beijing (CN)

(72) Inventors: Jincheng Yu, Beijing (CN); Song Yao, Beijing (CN)

(73) Assignee: XILINX TECHNOLOGY BEIJING LIMITED, Beijing (CN)

(*) Notice: Subject to any disclaimer, the term of this patent is extended or adjusted under 35 U.S.C. 154(b) by 982 days.

(21) Appl. No.: 15/247,956

(22) Filed: Aug. 26, 2016

(65) Prior Publication Data
US 2018/0046913 A1 Feb. 15, 2018

Related U.S. Application Data

(63) Continuation-in-part of application No. 15/242,624, filed on Aug. 22, 2016, and a continuation-in-part of
(Continued)

(30) Foreign Application Priority Data

Aug. 12, 2016 (CN) .......................... 2016 1 0663201
Aug. 12, 2016 (CN) .......................... 2016 1 0663563

(51) Int. Cl.
*G06N 3/06* (2006.01)
*G06F 13/10* (2006.01)
*G06F 13/28* (2006.01)
*G06N 3/04* (2006.01)
*G06N 3/063* (2006.01)
*G06N 3/08* (2006.01)

(52) U.S. Cl.
CPC ............ *G06F 13/102* (2013.01); *G06F 13/28* (2013.01); *G06N 3/0454* (2013.01); *G06N 3/063* (2013.01); *G06N 3/082* (2013.01)

(58) Field of Classification Search
CPC ...... G06N 3/063; G06N 3/0454; G06N 3/082; G06F 13/102; G06F 13/28
USPC ............................................................. 706/33
See application file for complete search history.

(56) References Cited

U.S. PATENT DOCUMENTS 5,155,830 A 10/1992 Kurashige
5,175,818 A 12/1992 Kunimoto
(Continued)

FOREIGN PATENT DOCUMENTS

CN 102129397 A 7/2011
CN 104915322 A 9/2015
(Continued)

OTHER PUBLICATIONS

Qiu et al ("Going Deeper with Embedded FPGA Platform for Convolutional Neural Network" Feb. 2016) (Year: 2016).*
(Continued)

*Primary Examiner* — Lut Wong
(74) *Attorney, Agent, or Firm* — IPro, PLLC

(57) ABSTRACT

The present invention relates to artificial neural network (ANN), for example, convolutional neural network (CNN). In particular, the present invention relates to how to implement and optimize a convolutional neural network based on an embedded FPGA. Specifically, it proposes a CPU+FPGA heterogeneous architecture to accelerate ANNs.

17 Claims, 9 Drawing Sheets

Related U.S. Application Data application No. 15/242,622, filed on Aug. 22, 2016, now Pat. No. 10,621,486.

(56) References Cited

U.S. PATENT DOCUMENTS

| | | |
|---|---|---|
| 6,411,984 B1 | 6/2002 | Leach |
| 9,317,482 B2 | 4/2016 | Davis |
| 1,031,134 A1 | 6/2019 | Farhadi Ali |
| 2016/0328644 A1 | 11/2016 | Lin |
| 2016/0379109 A1 | 12/2016 | Chung |
| 2017/0076195 A1 | 3/2017 | Yang |
| 2017/0228345 A1 | 8/2017 | Gupta |
| 2017/0243085 A1 | 8/2017 | Vanhoucke |
| 2017/0316286 A1 | 11/2017 | Szegedy |
| 2018/0046894 A1 | 2/2018 | Yao |
| 2018/0046896 A1 | 2/2018 | Yu |
| 2018/0046903 A1 | 2/2018 | Yao |
| 2018/0046905 A1 | 2/2018 | Li |
| 2018/0046913 A1 | 2/2018 | Yu |
| 2018/0068207 A1 | 3/2018 | Szegedy |
| 2018/0089834 A1 | 3/2018 | Spizhevoy |
| 2019/0034784 A1 | 1/2019 | Li |
| 2019/0034796 A1 | 1/2019 | Li |

FOREIGN PATENT DOCUMENTS

| | | |
|---|---|---|
| CN | 105488565 A | 4/2016 |
| CN | 205139973 U | 4/2016 |
| CN | 105681628 A | 6/2016 |
| CN | 105760933 A | 7/2016 |

OTHER PUBLICATIONS

Sulaiman et al ("Design and Implementation of FPGA-Based Systems—A Review" 2009) (Year: 2009).*
Farabet et al ("Large-Scale FPGA-based Convolutional Networks" 2011) (Year: 2011).*
Chen et al ("A Small-Footprint Accelerator for Large-Scale Neural Networks" May 2015) (Year: 2015).*
Going Deeper with Embedded FPGA Platform for Convolutional Neural Network, DOI: 10.1145/2847263.2847265.
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.
Image-Net Large-Scale Vision Recognition Challenge (ILSVRC) 2012.
Long short-term memory recurrent neural network architectures for large scale acoustic modeling[C]// Interspeech. 2014: 338-342.
Long short-term memory based recurrent neural network architectures for large vocabulary speech recognition[J]. arXiv preprint arXiv:1402.1128,2014.
Deep compression: Compressing deep neural networks with pruning, trained quantization and Huffman coding.
Diannao: A small-footprint high-throughput accelerator for ubiquitous machine-learning.
Dadiannao: A machine-learning supercomputer.
Shidiannao: shifting vision processing closer to the sensor.
Learning both Weights and Connections for Efficient Neural Networks, arXiv:1506.02626v3 [cs.NE] Oct. 30, 2015.
Reconfigurable pipelined 2-d convolvers for fast digital signal processing.
A dynamically configurable coprocessor for convolutional neural networks.
Second order derivatives for network pruning: Optimal brain surgeon.
Cnp: An fpga-based processor for convolutional networks.
Optimizing fpga-based accelerator design for deep convolutional neural networks.
Pudiannao: A polyvalent machine learning accelerator.
DSD: Regularizing Deep Neural Networks with Dense-Sparse-Dense Training Flow in NIPS 2016.
Long Short-term Memory, Neural Computation 9(8):1735-80 . Dec. 1997, DOI: 10.1162/neco.1997.9.8.1735.
Guo et al., Angel-Eye: A Complete Design Flow for Mapping CNN onto Customized Hardware, 2016, IEEE Computer Society Annual Symposium on VLSI, pp. 24-29 (Year: 2016).
Chung et al., Simplifying Deep Neural Networks for Neuromorphic Architectures, Jun. 2016, DAC '16, 6 total pages (Year: 2016).
Gysel, Ristretto: Hardware-Oriented Approximation of Convolutional Neural Networks, May 2016, UC Davis Master Thesis published on arXiv, 73 total pages (Year: 2016).
Han et al., EIE: Efficient Inference Engine on Compressed Deep Neural Network, 2016, ACM/IEEE 43rd Annual International Symposium on Computer Architecture, pp. 243-254 (Year: 2016).
Kruatrachue et al., "Grain Size Determination for Parallel Processing," in 5.1 IEEE Software 23-32. (Year: 1988).
Suda et al., "Throughput-Optimized OpenCL-based FPGA Accelerator for Large-Scale Convolutional Neural Networks," in Proceedings of the 2016 ACM/SIGDA Intl. Symposium on Field-Programmable Gate Arrays 16-25. (Year: 2016).
Guo et al., "From Model to FPGA: Software-Hardware Co-Design for Efficient Neural Network Acceleration," in 2016 IEEE Hot Chips Symposium 1-27. (Year: 2016).
Szegedy et al., "Going deeper with convolutions", In CVPR, 2015, pp. 1-9 (Year: 2015).

* cited by examiner

| | | | | | | | | | |
|---|---|---|---|---|---|---|---|---|---|
| Example 1 | | | | | | | | | |
| CPU | ...... | Read map1 | Pre-process map1 | Process map1 | Output map1 | Read map2 | Pre-process map2 | Process map2 | Output map2 |
| Accelerator | ...... | | | Process map1 | | | | Process map2 | ...... |
| Example 2 | | | | | | | | | |
| CPU | ...... | Read map1 | Pre-process map1 | Output map0 | Read map2 | Pre-process map2 | Output map1 | ...... | |
| Accelerator | ...... | | Process map1 | Process map2 | | Pre-process map2 | | Process map1 | Process map2 |

Figure 9

COMBINING CPU AND SPECIAL ACCELERATOR FOR IMPLEMENTING AN ARTIFICIAL NEURAL NETWORK

CROSS REFERENCE TO RELATED APPLICATIONS

This application claims priority to Chinese Patent Application Number 201610663563.8 filed on Aug. 12, 2016, Chinese Patent Application Number 201610663201.9 filed on Aug. 12, 2016, U.S. application Ser. No. 15/242,622 filed on Aug. 22, 2016, U.S. application Ser. No. 15/242,624 filed on Aug. 22, 2016, the entire content of which are incorporated herein by reference.

TECHNICAL FIELD

The present invention relates to artificial neural network, for example, convolutional neural network. In particular, the present invention relates to how to implement a neural network by combining both a general processor and a special neural network processor.

BACKGROUND ATR

Artificial neural network (ANN), in particular, convolutional neural network (CNN) has achieved great success in various fields. For example, in the field of computer vision (CV), CNN is widely used and most promising. However, CNN model is memory-intensive. Thus, it is desired to implement a CNN on a FPGA or other specially designed hardware. However, special designed hardware is typically good at performing relatively simple category of operations, but not good at flexibility.

Inventor Song Yao has proposed a design of combing both CPU (e.g., ARM) and FPGA in his paper "Going Deeper With Embedded FPGA Platform for Convolutional Neural Network" (FPGA 2016.2). In his proposed solution, ARM is configured to transmit data and instructions.

SUMMARY

On the basis of the above mentioned paper, the inventor proposes further improvements in the present application. It gives a more efficient and detailed hardware design for implementing CNN, which combines both general processing unit and a special neural network processing unit.

According to one aspect of the invention, it proposes a deep processing unit (DPU) for implementing an Artificial Neural Network (ANN), comprising: a CPU, configured for scheduling a programmable logic module and a direct memory access (DMA); a direct memory access (DMA), connected to the CPU, an external memory and a programmable logic module, used for communication between the external memory and the programmable logic module; an external memory, coupled to the CPU and the DMA, configured for storing instructions of the ANN and data to be processed by said ANN; a programmable logic module (PL), comprising: a controller, configured for getting instructions and scheduling operations of a computing complex on the basis of the instructions, a computing complex, including a plurality of processing elements (PEs), configured for performing operations on the basis of the instructions and data; a buffer, configured for preparing the data and instructions for the computing complex; wherein the CPU is configured to control the DMA to transmit data and instructions between the external memory and the programmable logic module.

In addition, the DMA is configured to transmit data between the external memory and the programmable logic module via FIFO.

In addition, DMA is configured to transmit instructions between the external memory and the programmable logic module via FIFO.

According to another aspect of the invention, it proposes a deep processing unit (DPU) for implementing an Artificial Neural Network (ANN), comprising: a CPU, configured for scheduling a programmable logic module and a direct memory access (DMA); a direct memory access (DMA), connected to the CPU, an external memory and a programmable logic module, used for communication between the external memory and the programmable logic module; an external memory, coupled to the CPU, the DMA and a programmable logic module, configured for storing instructions of the ANN and data to be processed by said ANN; a programmable logic module (PL), comprising: a controller, configured for getting instructions and scheduling operations of a computing complex on the basis of the instructions, a computing complex, including a plurality of processing elements (PEs), configured for performing operations on the basis of the instructions and data, a buffer, configured for preparing the data and instructions for the computing complex; wherein the CPU is configured to control the DMA to transmit instructions between the external memory and the programmable logic module; and wherein the external memory and the programmable logic module transmit data to each other directly.

In addition, the DMA is configured to transmit instructions between the external memory and the programmable logic module via FIFO.

In addition, wherein the CPU further comprises: status monitoring module, configure for monitoring status of a Finite State Machine (FSM) of the controller in the programmable logic module.

In addition, the PE further comprises: a convolver complex, coupled to the buffer to receive weights of ANN and said data, configured for performing convolutional operations of the ANN; adder tree, coupled to the convolver complex, configured for summing results of convolution operation; non-linear (NL) module, coupled to the adder tree, configured for applying a non-linear function to the output of adder tree.

In addition, the PE further comprises: pooling module, coupled to the NL module, configured for performing max-pooling operation on the output of NL module.

In addition, the buffer further comprises: input buffer, configured for preparing the data, instructions for said convolver complex; output buffer, for storing and outputting data results.

In addition, the buffer further comprises: bias shift, coupled to the input buffer, configured for shifting weights of ANN between different numerical ranges and providing said shifted weights to the adder tree, wherein the weights are quantized fixed-point numbers.

In addition, wherein the CPU, the programmable logic module and the DMA are implemented in one single SOC.

In addition, wherein the external memory is implemented by a separate memory chip.

According to another aspect of the invention, it proposes a method for implementing an Artificial Neural Network (ANN), comprising: providing a CPU for scheduling a programmable logic module and a direct memory access (DMA); providing a direct memory access (DMA) connected to the CPU, an external memory and a programmable logic module, for communication between the external memory and the programmable logic module; providing an external memory coupled to the CPU and the DMA, for storing instructions of the ANN and data to be processed by said ANN; providing a programmable logic module (PL), comprising: a controller, configured for getting instructions and scheduling operations of a computing complex on the basis of the instructions; a computing complex, including a plurality of processing elements (PEs), configured for performing operations on the basis of the instructions and data; a buffer, configured for preparing the data and instructions for the computing complex; transmitting data and instructions between the external memory and the programmable logic module via DMA under the control of CPU.

According to another aspect of the invention, it proposes a method for implementing an Artificial Neural Network (ANN), comprising: providing a CPU for scheduling a programmable logic module and a direct memory access (DMA); providing a direct memory access (DMA) coupled to the CPU, an external memory and a programmable logic module, for communication between the external memory and the programmable logic module; providing an external memory coupled to the CPU, the DMA and a programmable logic module, for storing instructions of the ANN and data to be processed by said ANN; providing a programmable logic module (PL), comprising: a controller, configured for getting instructions and scheduling operations of a computing complex on the basis of the instructions; a computing complex, including a plurality of processing elements (PEs), configured for performing operations on the basis of the instructions and data; a buffer, configured for preparing the data and instructions for the computing complex; transmitting instructions between the external memory and the programmable logic module via DMA under the control of CPU; and transmitting data between the external memory and the programmable logic module directly.

BRIEF DESCRIPTION OF THE DRAWINGS

FIG. 9 illustrates the processing differences between the first and second embodiments.

EMBODIMENTS OF INVENTION

Some content of the present application has been proposed by the inventor in a previous paper "Going Deeper With Embedded FPGA Platform for Convolutional Neural Network" (FPGA 2016.2). In the present application, the inventor proposes further improvements on the basis of the previous paper.

In order to illustrative the concepts of the present invention, the application explains how CNN is applied in image processing, e.g., image classification/prediction. Other Artificial Neural Network, such as DNN and RNN, can be improved and implemented in a similar manner.

Concepts of CNN

Figure 1A:
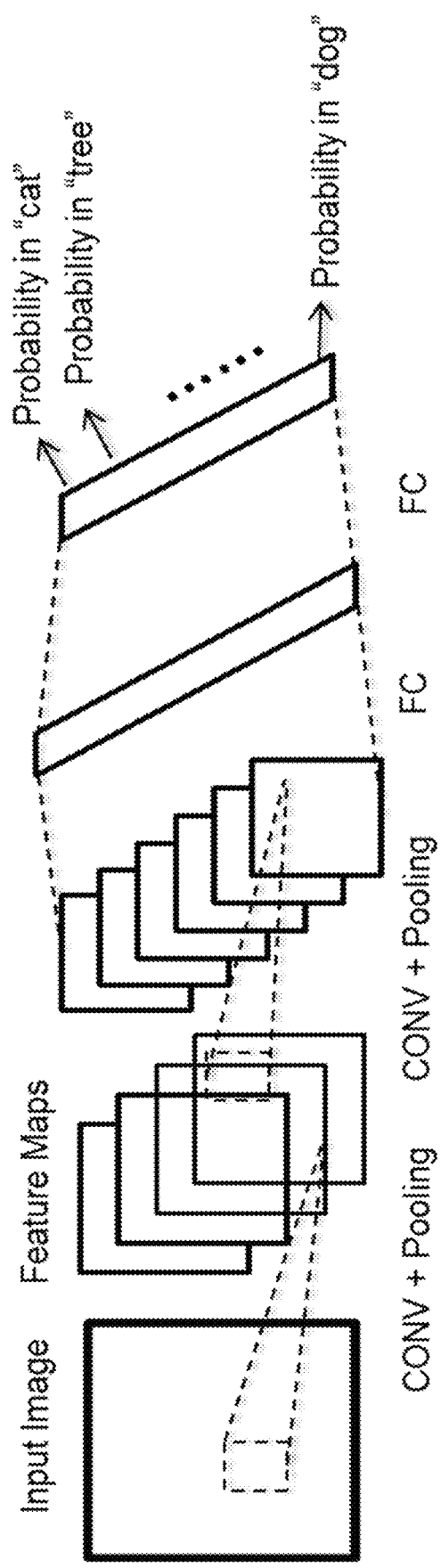
FIG. 1A shows a typical CNN according to the present invention.

As shown in FIG. 1A, a typical CNN consists of a number of layers that run in sequence.

The parameters of a CNN model are called "weights". The first layer of a CNN reads an input image and outputs a series of feature maps. The following layers read the feature maps generated by previous layers and output new feature maps. Finally a classifier outputs the probability of each category that the input image might belong to.

CONV layer and FC layer are two essential types of layer in CNN. After CONV layers, there are usually pooling layers.

For a CNN layer, $f_j^{in}$ denotes its j-th input feature map, $f_i^{out}$ denotes the i-th output feature map, and $b_i$ denotes the bias term to the i-th output map.

For CONV layers, $n_{in}$ and $n_{out}$ represent the number of input and output feature maps respectively.

For FC layers, $n_{in}$ and $n_{out}$ are the length of the input and output feature vector.

A CONV layer takes a series of feature maps as input and convolves with convolutional kernels to obtain the output feature map.

A nonlinear layer, which applies nonlinear activation function to each element in the output feature maps is often attached to CONV layers.

The CONV layer can be expressed with Equation 1:

$$f_i^{out} = \sum_{j=1}^{n_{in}} f_j^{in} \otimes g_{i,j} + b_i (1 \leq i \leq n_{out}) \quad (1)$$

where $g_{ij}$ is the convolutional kernel applied to j-th input feature map and i-th output feature map.

FC layer applies a linear transformation on the input feature vector:

$$f^{out} = Wf^{in} + b \quad (2)$$

where W is an $n_{out} \times n_{in}$ transformation matrix and b is the bias term. It should be noted, for the FC layer, the input is not a combination of several 2-D feature maps but just a feature vector. Consequently, in Equation 2, the parameter $n_{in}$ and $n_{out}$ actually corresponds to the lengths of the input and output feature vector.

Pooling layer, which outputs the maximum or average value of each subarea in each feature maps, is often attached to the CONV layer. Max-pooling can be expressed as Equation 3:

$$f_{i,j}^{out} = \max_{p \times p} \begin{pmatrix} f_{m,n}^{in} & \cdots & f_{m,n+p-1}^{in} \\ \vdots & & \vdots \\ f_{m+p-1,n}^{in} & \cdots & f_{m+p-1,n+p-1}^{in} \end{pmatrix} \quad (3)$$

where p is the pooling kernel size. This non-linear "down sampling" not only reduces the feature map size and the computation for later layers, but also provides a form of translation invariance.

CNN can be used to classify images in a forward inference process. But before using the CNN for any task, one should first train the CNN on a dataset. Recent research showed that, a CNN model pre-trained on a large dataset for a given task can be used for other tasks and achieved high accuracy with minor adjustment in network weights. This minor adjustment is called "fine-tune". The training of the CNN is mostly implemented on large servers. For embedded FPGA platform, we only focus on accelerating the inference process of a CNN.

Image-Net Dataset

Image-Net dataset is regarded as the standard benchmark to evaluate the performance of image classification and object detection algorithms. So far Image-Net dataset has collected more than 14 million images within more than 21 thousand categories. Image-Net releases a subset with 1.2 million images in 1000 categories for the ILSVRC classification task, which has significantly promoted the development of CV techniques. In this paper, all the CNN models are trained with ILSVRC 2014 training dataset and evaluated with ILSVRC 2014 validation set.

State-of-the-Art CNN Models

In ILSVRC 2012, the SuperVision team won the first place in image classification task using AlexNet by achieving 84.7% top-5 accuracy. CaffeNet is a replication of AlexNet with minor changes. Both of AlexNet and CaffeNet consist of 5 CONV layers and 3 FC layers.

The Zeiler-and-Fergus (ZF) network achieved 88.8% top-5 accuracy and won the first place in image classification task of ILSVRC 2013. The ZF network also has 5 CONV layers and 3 FC layers.

Figure 1B:
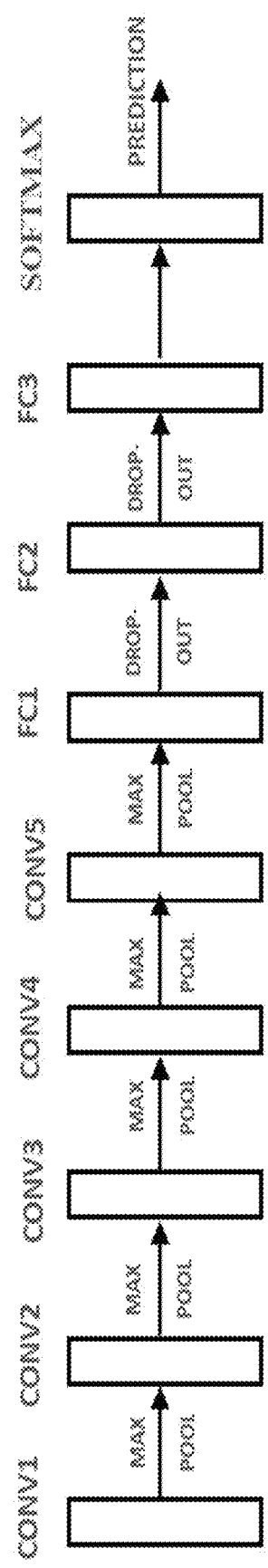
FIG. 1B shows an illustration of how CONV layers, FC layers of a CNN are connected in serial, and how data (feature maps) are processed through these layers.

As shown in FIG. 1B, from a perspective of signal flow, a typical CNN consists of a number of layers that run in sequence.

There are five CONV groups, CONV 1, CONV 2, CONV 3, CONV 4, CONV 5, each comprising 3 CONV layers, total of which are 15 CONV layers. A pooling layer is attached after each CONV group. After the CONV layers, there are three FC layers, FC1, FC2 and FC 3. A softmax function is arranged after the FC layers to give predictions.

Figure 2:
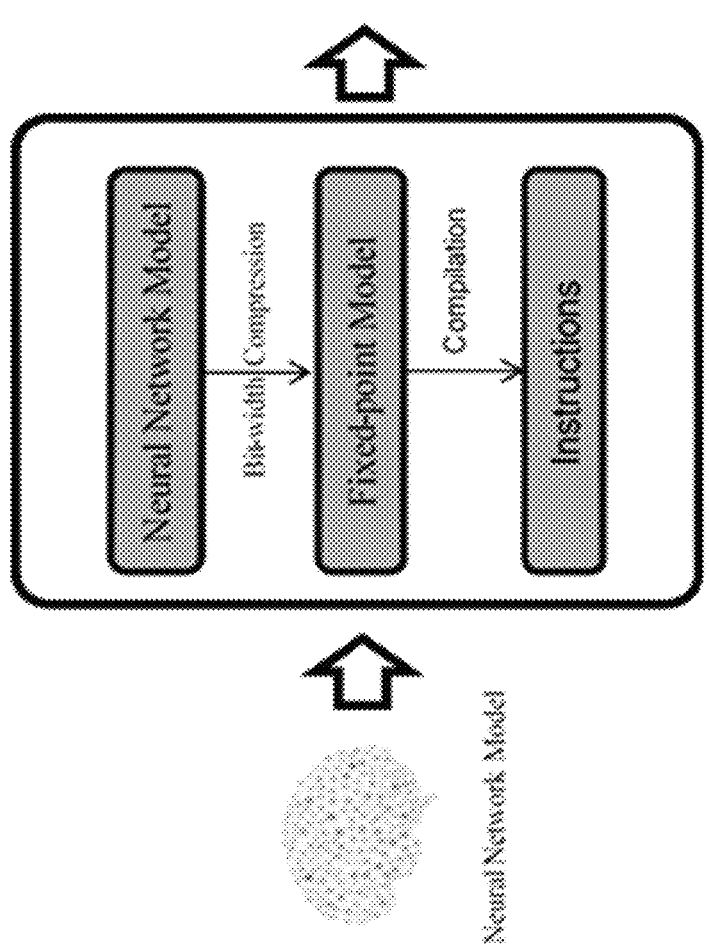
FIG. 2 shows a flow of optimizing and implementing a CNN model on hardware.
Figure 2:
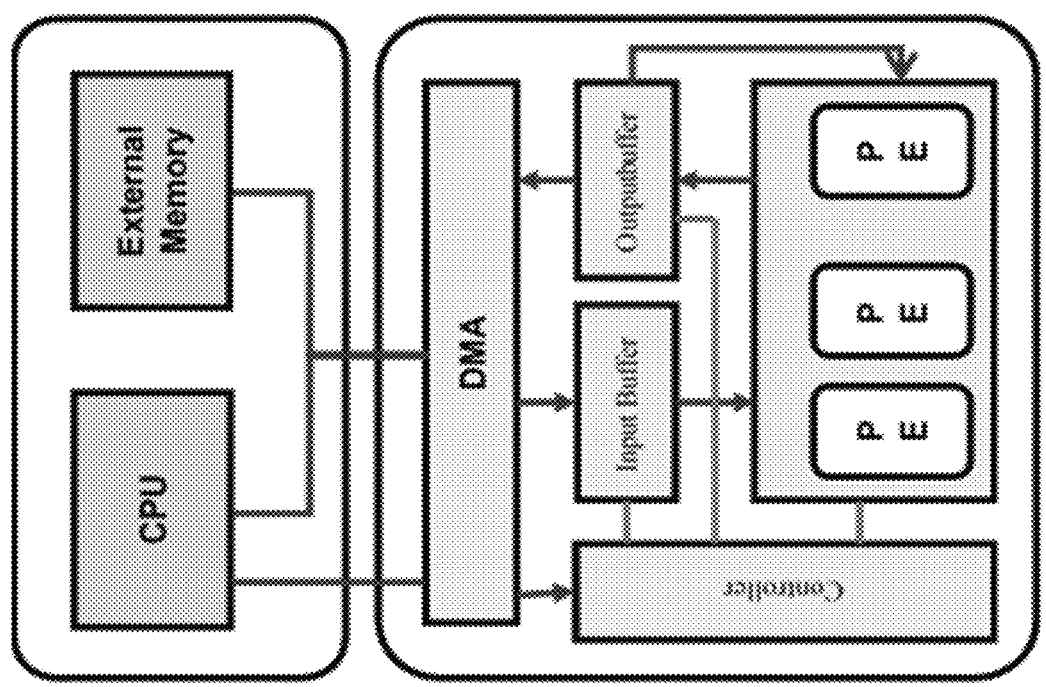

FIG. 2 proposes an overall solution for accelerating a neural network from both algorithm and hardware design.

At the lower end of FIG. 2, it shows an Artificial Neural Network (ANN), such as a CNN, which is to be optimized and implemented by the present invention. In FIG. 2, it is input into the optimization flow shown in the middle.

In the middle of FIG. 2, it shows how to optimize a CNN from the algorithm perspective, in order to reduce both memory and computation resources it requires to implement a CNN, while suffer minimum loss of accuracy.

In the top of FIG. 2, it shows how to implement a CNN from a hardware perspective. The optimized CNN is input to the special ANN accelerator and implemented thereon.

Referring to top part of FIG. 2, it proposes a CPU (PS)+FPGA (PL) heterogeneous architecture to implement ANNs. The whole system can be divided into two parts: the Programmable Logic (PL) and the Processing System (PS).

PL is, for example, a FPGA chip, on which we place the Computing Complex, On-chip Buffers, Controller, and DMAs.

The Computing Complex consists of Processing Elements (PEs) which take charge of the majority of computation tasks in CNN, including CONV layers, Pooling layers, and FC layers.

On-chip buffers include input buffer and output buffer, which are used prepare data to be used by PEs and store the results.

Controller fetches instructions from the external memory and decodes them to orchestrate all the modules except DMAs on the PL.

DMAs are working for transferring data and instructions between the external memory on the PS side and On-chip Buffers on the PL side.

PS consists of a general-purpose processor and an external memory.

The external memory, e.g., a DDR, stores all the ANN model parameters, data, and instructions are stored.

The processor, e.g., a CPU, run bare-metal programs and help to orchestrate the whole inference phase by configuring the DMAs.

The PS has a fixed hardware structure and is scheduled by software.

The PL is programmable, and thus has a flexible hardware structure. For example, the PL is a FPGA chip.

It should be understand that top of FIG. 2 merely shows a function view of the hardware design. The division between PL and PS is from the functional perspective, and is flexible based on actual circumstances. For example, the PL and CPU can be implemented into one single SOC, such as Xilinx Zynq chip. Said external memory can be implemented by a separate memory chip, and coupled to the SOC.

Figure 3:
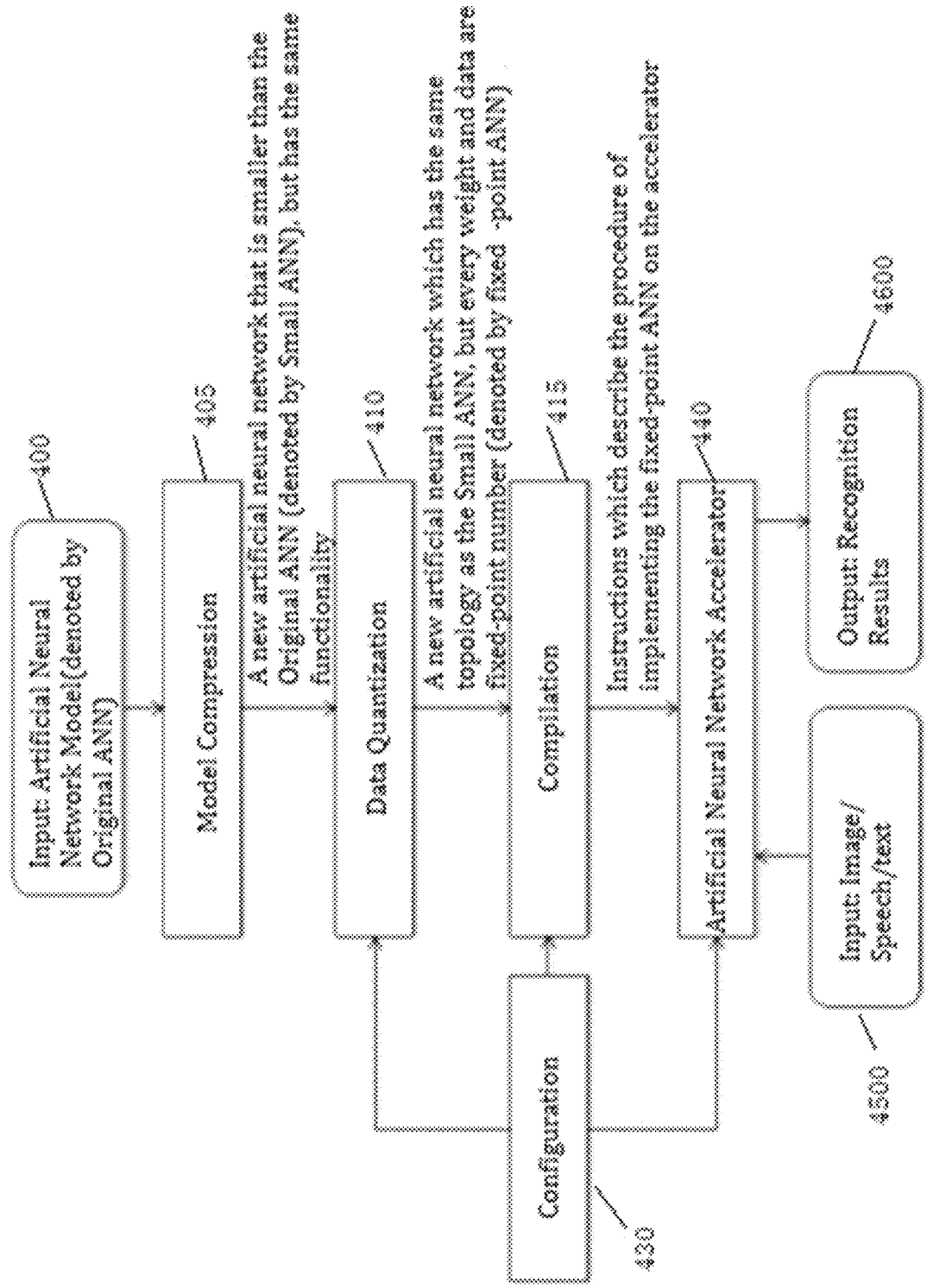
FIG. 3 shows an overall process of optimizing a CNN model.

FIG. 3 shows the process of optimizing a neural network before implementing it in hardware with more details.

In FIG. 3, an original CNN is input.

Step 405: Compression

The compressing step comprises pruning the CNN. Network pruning is proposed to compress CNN models. In the known art, network pruning proved to be a valid way to reduce the network complexity and over-fitting. For example, refer to B. Hassibi and D. G. Stork, "Second order derivatives for network pruning: Optimal brain surgeon".

In one priority application, the inventors discloses how to prune and compress a neural network.

Firstly, it initializes said ANN to establish all connections of CONV layers and FC layers, said connections being assigned weights of random values.

Secondly, it trains said ANN by adjusting weights of ANN until the accuracy of ANN reaches a predetermined level.

For example, said training uses a stochastic gradient descent algorithm to adjust weights of ANN. For example, the values of weights are stochastically adjusted, and then are chosen based on the gradient descent of ANN's accuracy.

The accuracy of ANN can be measured by, for example, inputting a benchmark test data to the ANN and decide how accurate the prediction results of said ANN is.

Thirdly, it prunes said ANN to prune insignificant connections, said insignificant connections are decided based on one or more predetermined criteria.

For example, it uses at least one of the following as said predetermined criteria: if weight of a connection is zero, said connection is insignificant. Or, if weight of a connection is smaller than a threshold, said connection is insignificant.

Fourthly, it fine-tunes said ANN to restore the pruned connections, and assign zero-value weights to said restored connections.

Lastly, it repeats the second, third and fourth steps, until the accuracy of ANN reaches a predetermined level.

Step 410: Fix-Point Quantization

For a fixed-point number, its value can be expressed as $$n = \sum_{i=0}^{bw-1} B_i \cdot 2^{-fl} \cdot 2^i \qquad (4)$$

where bw is the bit width of the number and $f_l$ is the fractional length which can be negative.

In order to convert floating-point numbers into fixed-point ones while achieving the highest accuracy, it proposes a dynamic-precision data quantization strategy and an automatic workflow.

Unlike previous static precision quantization strategies, in the proposed data quantization flow, $f_l$ is dynamic for different layers and feature map sets while static in one layer to minimize the truncation error of each layer.

The proposed quantization flow mainly consists of two phases: the weight quantization phase, and the data quantization phase.

The weight quantization phase aims to find the optimal $f_l$ for weights in one layer, as shown in Equation 5:

$$f_l = \underset{f_l}{\mathrm{argmin}} \sum |W_{float} - W(bw, f_l)| \quad (5)$$

where W is a weight and W(bw; $f_l$) represents the fixed-point format of W under the given bw and $f_l$ In one embodiment, the dynamic ranges of weights in each layer is analyzed first, for example, by sampling. After that, the $f_l$ is initialized to avoid data overflow. Furthermore, we search for the optimal $f_l$ in the adjacent domains of the initial $f_l$.

In an alternative embodiment, the optimal $f_l$ is decided based on the following Equation 6.

$$f_l = \underset{f_l}{\mathrm{argmin}} \sum |\sum k_i |W_{float_i} - W(bw, f_l)_i|| \quad (6)$$

wherein W is the weight matrix of one layer, W (bw, $f_l$) represents the fixed-point format of W under the given bw and $f_l$, i represents one bit out of bw bits, ki represents the weight of said bit i.

The data quantization phase aims to find the optimal $f_l$ for a set of feature maps between two layers.

In this phase, the intermediate data of the fixed-point CNN model and the floating-point CNN model are compared layer by layer using a greedy algorithm to reduce the accuracy loss. For each layer, the optimization target is shown in Equation 7:

$$f_l = \underset{f_l}{\mathrm{argmin}} \sum |x^+_{float} - x^+(bw, f_l)| \quad (7)$$

In Equation 7, x+ represents the result of a layer when we denote the computation of a layer as $x^+ = A \cdot x$. It should be noted, for either CONV layer or FC layer, the direct result $x^+$ has longer bit width than the given standard. Consequently, truncation is needed when optimizing fl selection. Finally, the entire data quantization configuration is generated.

In an alternative embodiment, we use the following Equation 8 to find $f_l$.

$$f_l = \underset{f_l}{\mathrm{argmin}} \sum |\sum_N k_i |X^+_{float_i} - X^+(bw, f_l)_i|| \quad (8)$$

wherein $x^+ = A \cdot x$, A represents the operation applied by one of the CONV layers and FC layers of the ANN, x represents the input of one layer, x+ represents the output of said layer, i represents one bit out of bw bits, $k_i$ represents the weight of said bit i.

In the above example of data quantization, weight quantization is conducted before data quantization. That is, it finishes weight quantization of all CONV layers and FC layers of the ANN, and then conducts data quantization for each feature map set on the basis of the quantized CONV layers and FC layers.

According to another embodiment of the present invention, it performs weight quantization and data quantization in an alternative (i.e., interleaved) manner.

Specifically, for example, it conducts weight quantization for one of said CONV layers and FC layers in sequence; after conducting weight quantization for the present layer, but before conducting weight quantization for next layer of said CONV layers and FC layers, it conducts data quantization of feature map set output from said present layer.

Step 415: Compiling

As shown in FIG. 3, after the fixed-point quantization, the neural network is compiled and the resulted instructions are input to an ANN special accelerator.

The present application skips certain description in relation to step 415 of FIG. 3, which are not essential to the present invention. For more details of the compiling step, please refer to the prior applications filed by the inventor.

First Embodiment

In the claimed prior application, the inventor proposes to combine a general processing unit (e.g., a CPU) and a special processing unit (e.g., a FPGA) to implement a neural network. However, it is desired to further explore how to better utilize both the flexibility of a general processing unit and the computational capability of a special processing unit. In the present invention, the inventor proposes further solution regarding how to efficiently transmit data/instructions, how to execute instructions, etc. by optimizing the combined design of a general processing unit and a special processing unit.

Figure 4:
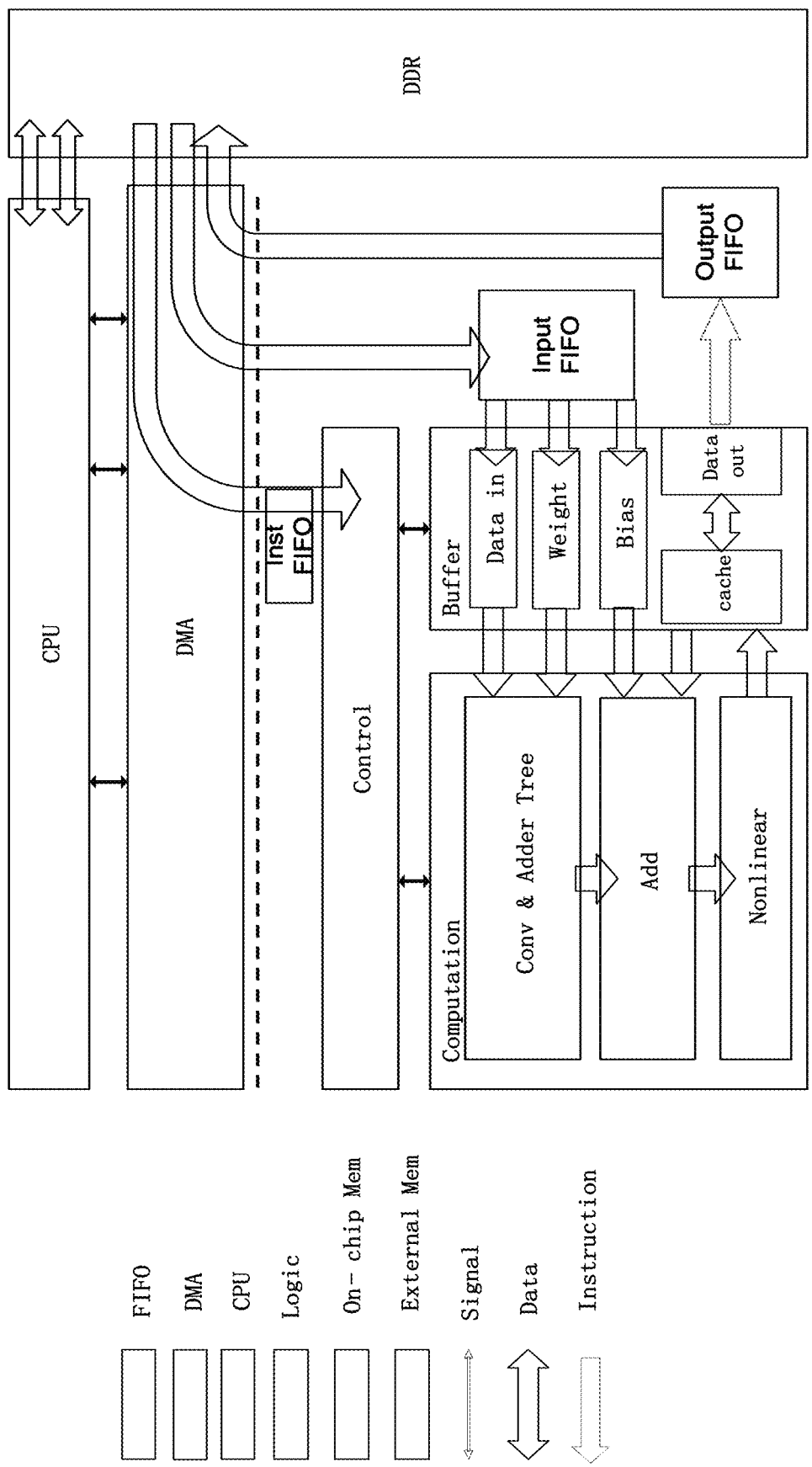
FIG. 4 shows a detailed hardware design of implementing a CNN by a general CPU and a special processing unit (e.g., DPU) according to the first embodiment of the present invention.

FIG. 4 shows further details and improvements over hardware design of FIG. 2.

In FIG. 4, CPU and DDR correspond to the processing system (PS) of FIG. 2, wherein DDR corresponds to the external memory of FIG. 2.

In FIG. 4, controller, computation complex, buffer correspond to the programmable logic (PL) of FIG. 2. Said PL is also referred as a "special neural network processing unit" hereinafter, which is in contrast to the general processing unit, a CPU.

In addition, as DMA is directly controlled by CPU, DMA is considered to be part of the PS from the operational aspect.

In FIG. 4, CPU controls the DMA, wherein DMA is responsible for instructions communication. Specifically, under the control of CPU, DMA transmit instructions from the external memory (e.g., DDR) to the FIFO unit. Then, PL (e.g., controller) gets instructions from FIFO for subsequent operations.

CPU also controls the DMA for data communication. Specifically, under the control of CPU, DMA transmit data from the external memory (e.g., DDR) to the another FIFO unit. Then, PL (e.g., buffer) gets data from FIFO for subsequent operations by the computational complex. In a similar manner, the output data from PL is transmitted to DDR via another FIFO.

In FIG. 4, it shows an input FIFO and an output FIFO at the PL side.

In running a neural network, CPU needs to monitor the status of DMA in real time. When the input FIFO is not full, the DMA transmits data from DDR to the input FIFO. When the output FIFO is not empty, the DMA transmit data from output FIFO to the DDR.

In addition, as shown in FIG. 4, more details of the controller, computation complex, and buffer at the PL side are explained below.

The computation complex comprises convolver, adder tree, NL module.

The size of convolver usually has only several options such as 3×3, 5×5, and 7×7. For example, the 2D convolvers are designed for convolution operation only over a 3×3 window.

Adder Tree (AD) sums all the results from convolvers. It can add the intermediate data from Output Buffer or bias data from Input Buffer if needed.

Non-Linearity (NL) module applies non-linear activation function to the input data stream. Said NL function might be a ReLU.

Max-Pooling module utilizes the line buffers to apply the specific 2×2 window to the input data stream, and outputs the maximum among them.

As shown in FIG. 4, the buffer comprises an input buffer (data in), an output buffer (data out) and a Bias Shift (bias). The Input Buffer stores the input image data. The Output Buffer saves the results generated from convolvers and offers intermediate results to the convolvers at proper time. In addition, the buffer might comprise a weight buffer for storing weights of neural network.

Bias Shift module is designed to support dynamic quantization. For example, weight will be shifted by Bias Shift according to the layer's quantization result. In addition, it may provide a Data shift (not shown), which is used for data shifting in fixed-point data quantization.

In certain embodiment, instead of having separate input data buffer and weight buffer, the input buffer further comprises an input data buffer and a weight buffer. Said weight buffer is for storing weights of the ANN. Said input data buffer might be a line data buffer, for storing data and holding the data with delayers in order to reuse the data.

Figure 5:
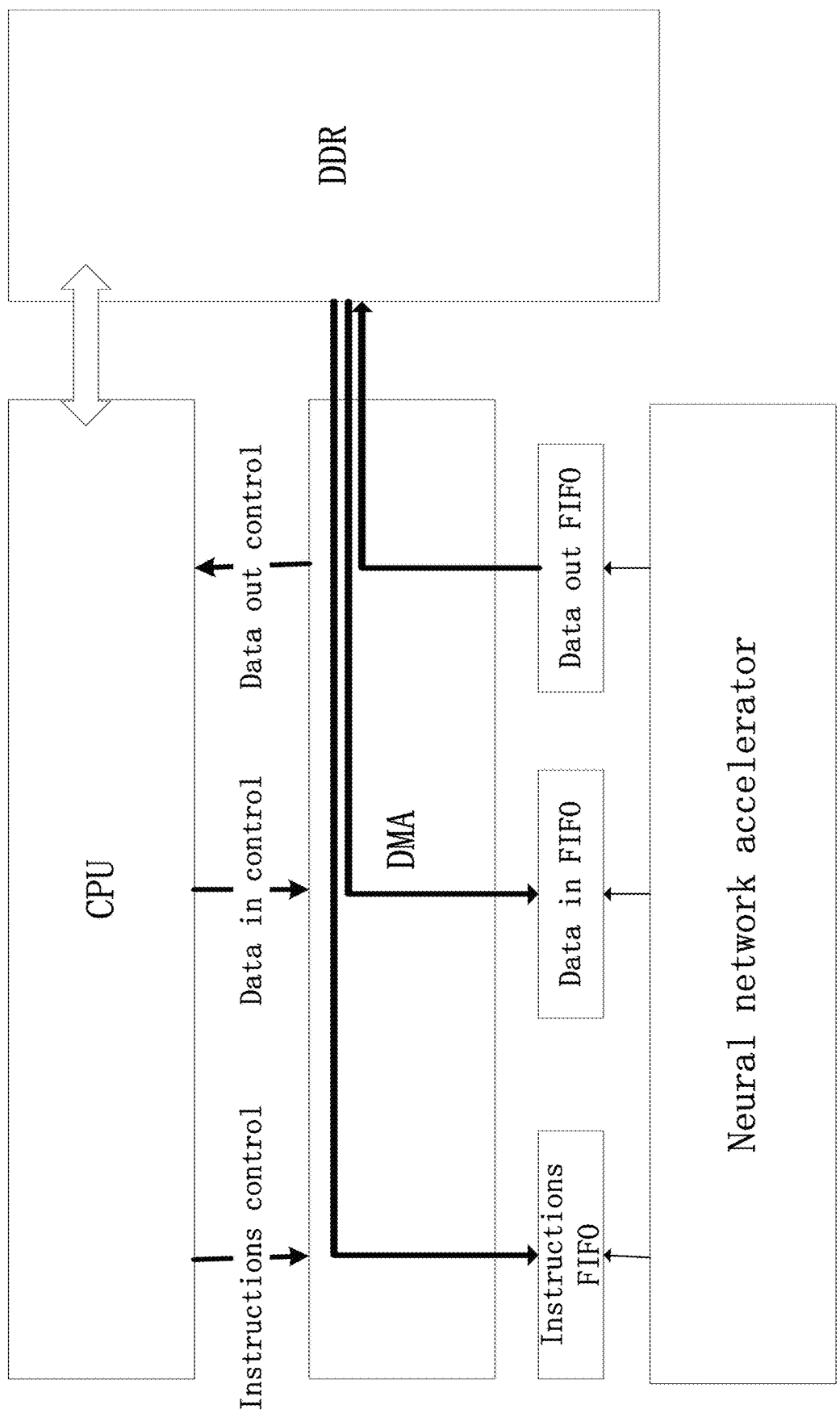
FIG. 5 shows the data are transmitted via FIFO mechanism according to the first embodiment of the present invention.

FIG. 5 shows the FIFO modules between the CPU (PS side) and a neural network accelerator (corresponding to PL side of FIG. 2, also referred as a special neural network processing unit hereinafter), which comprises the controller, buffer and computation complex of FIG. 4.

As shown in FIG. 5, there are three FIFOs. Accordingly, the CPU controls DMA via three FIFOs.

In the first embodiment, CPU completely communicates with the neural network accelerator via FIFOs. The three FIFOs are used for instructions, input data and output data respectively. In particular, under the control of CPU, DMA communicate data/instructions between the DDR and the neural network processing unit via the input FIFO, instruction FIFO and output FIFO.

The advantage of the first embodiment is the neural network accelerator does not handle data transfer, and thus can concentrate on calculations. CPU is completely responsible for data transfer.

However, the solution shown in FIG. 5 has some drawbacks in certain circumstances.

Firstly, it consumes lots of CPU resources because CPU is responsible for data transfer and DMA control. For example, CPU needs to monitor statuses of each FIFO and standby for data input and output. It takes a lot of CPU cycles to perform monitoring and corresponding operations. In certain applications, CPU is mainly occupied by these FIFO tasks and cannot handle other tasks, such as reading images into DDR, preliminary processing of images, etc.

Secondly, the neural network accelerator has to provide a plurality of FIFOs, which costs resources in PL.

Second Embodiment

The second embodiment is characterized by the following concepts. Firstly, the neural network accelerator shares the external memory with the CPU. That is, both CPU and the neural network accelerator have access to the external memory. Secondly, CPU merely schedules instruction input into the neural network accelerator. In this manner, CPU and the neural network accelerator share workloads more evenly, and CPU will handles certain tasks that special neural network processing unit cannot perform.

Figure 6:
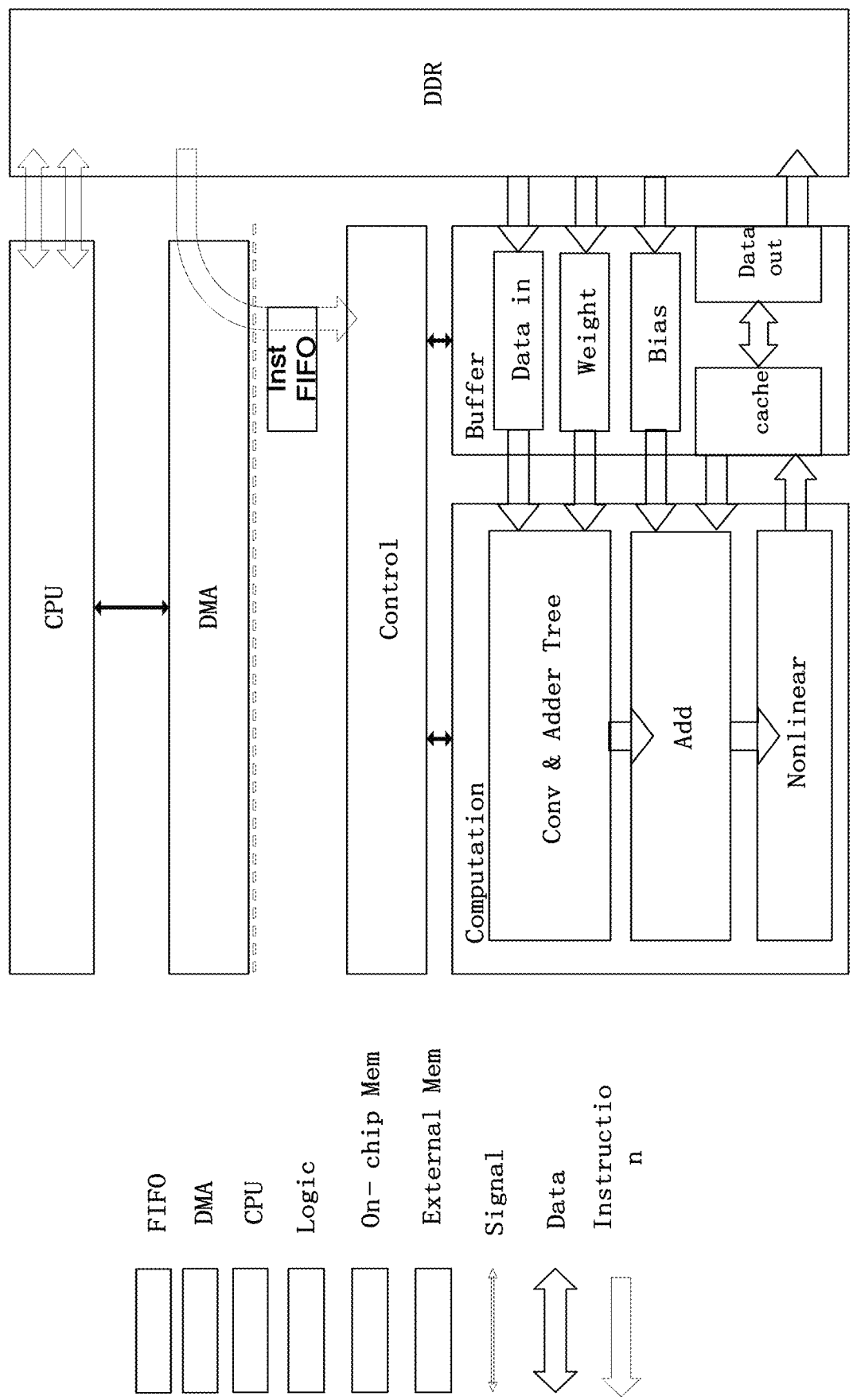
FIG. 6 shows a detailed hardware design of implementing a CNN by a general CPU and a special processing unit (e.g., FPGA) according to the second embodiment of the present invention.

As shown in FIG. 6, in the second embodiment, the CPU at the PS side and the neural network accelerator (in particular, buffer) at the PL side have direct access to the external memory (DDR). Accordingly, there is no input FIFO or output FIFO. Only the instruction FIFO is reserved for instruction transfer from DMA to the controller of the neural network accelerator.

In this manner, CPU will not handle the complicated data transfer/DMA scheduling. The neural network accelerator will obtain data from the DDR and output data to DDR directly. While running a neural network, the CPU can handle other tasks, such as reading images from camera into the DDR.

Accordingly, the second embodiment enables the CPU to handle other work, instead of scheduling data transfer. The price is that the neural network accelerator needs to take care of data access from/to DDR by itself Improvements Over First and Second Embodiments In both the first and second embodiments, CPU controls the neural network accelerator via instructions.

In running time, the neural network accelerator might run into an error status, such as a dead lock or other wrong mode. In the current embodiments, the CPU cannot decide whether such a status occurs.

The inventor proposes a variant of the first and second embodiment by providing an additional "status module" in CPU. Such status module is capable of obtaining status of a Finite State Machine (FSM) in the neural network accelerator to the CPU.

In this way, the CPU has knowledge of FSM. In case there is a running error, CPU may reset the neural network accelerator.

Figure 7:
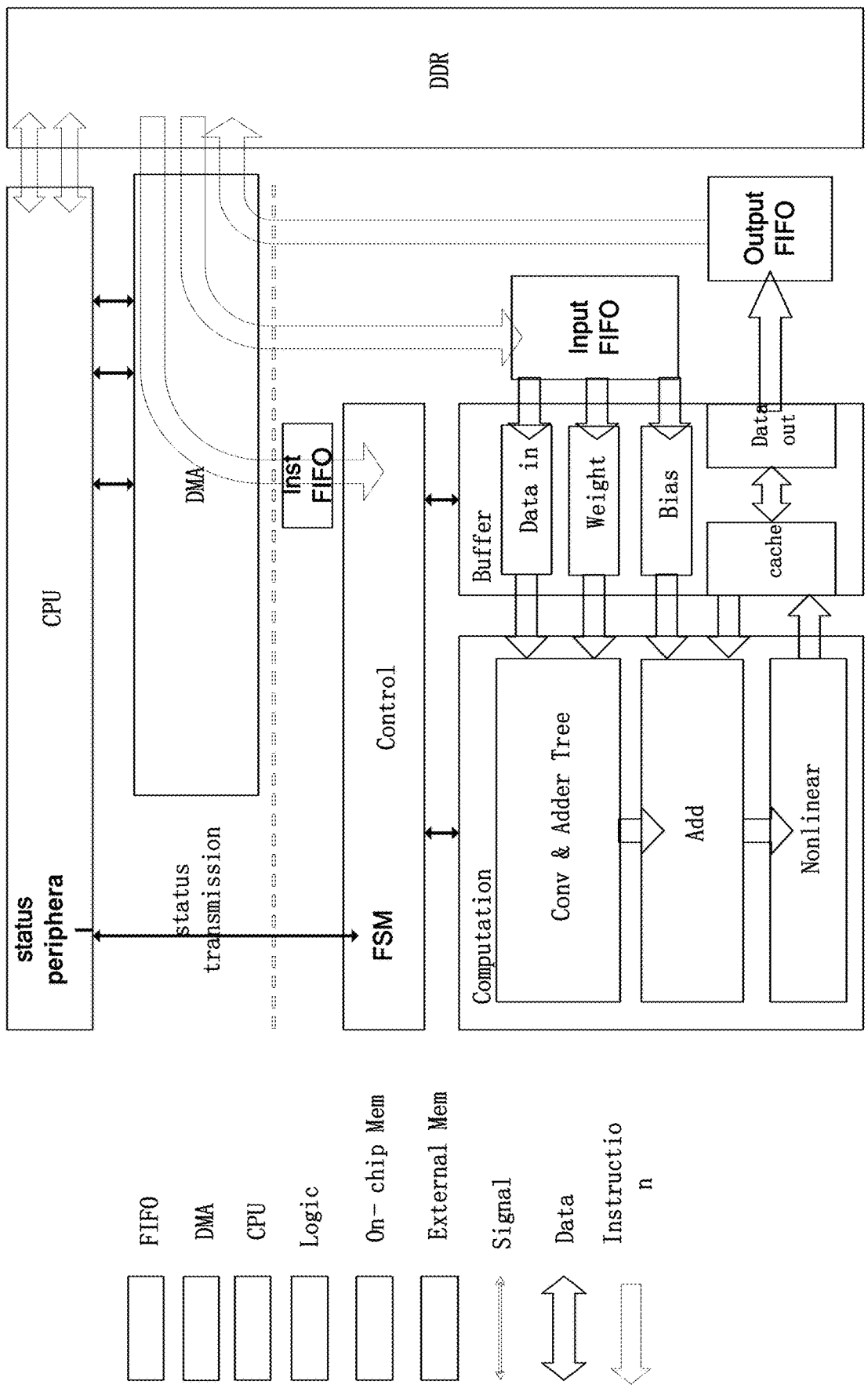
FIG. 7 shows improvements of the first embodiment.

FIG. 7 shows a variant of the first embodiment shown in FIG. 4 by adding a "status module".

Figure 8:
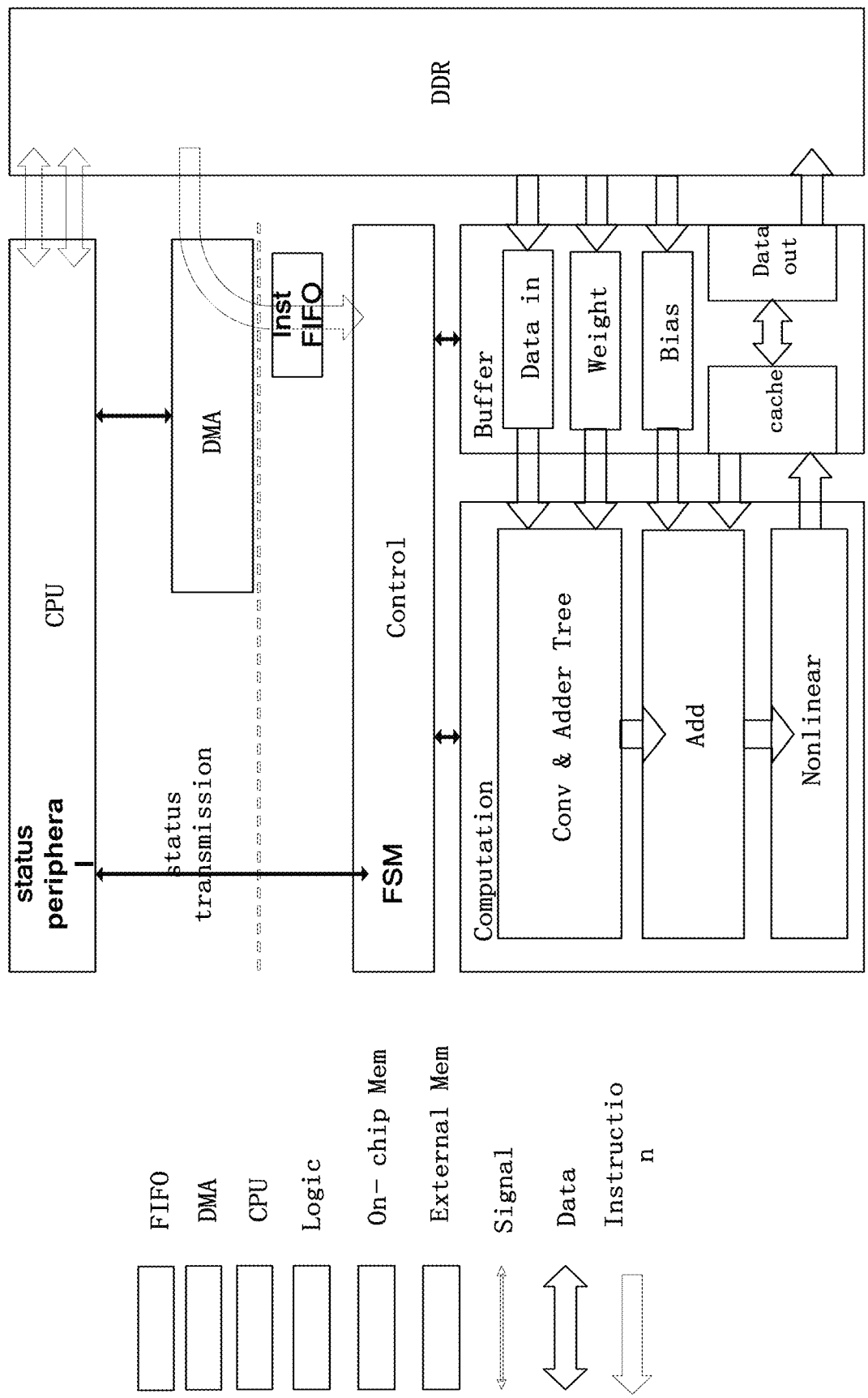
FIG. 8 shows improvements of the second embodiment.

FIG. 8 shows a variant of the second embodiment shown in FIG. 6 by adding a "status module".

As shown in FIGS. 7 and 8, the status module obtains status of FSM so that the CPU is aware of the running errors in the neural network accelerator.

Comparison of First and Second Embodiments

The first and second embodiments have their respective advantages under certain applications.

In the first embodiment shown in FIG. 4, image data needs to be transferred to the neural network accelerator via DMA under the control of CPU. Therefore, the neural network accelerator has more idle time. As the neural network accelerator does not handle data transfer, but only performs calculation, the computational capability of the neural network accelerator can be fully exploited, and the processing time required is relatively short.

In the second embodiment of FIG. 6, the neural network accelerator itself has ability to access data without help from DMA or CPU. CPU can spend more time transferring data from outside sources/destination to the DDR. For example, CPU reads images from a video camera (not shown in FIG. 6) to the DDR. Or, CPU outputs result data to a screen (not shown in FIG. 6).

With the second embodiment of FIG. 6, the tasks can be pipelined so as to improve efficiency. The disadvantages are that the neural network accelerator handles both calculation and data transfer, which requires longer time for processing.

FIG. 9 illustrates the advantages and disadvantages of the first embodiment and second embodiment by showing the processing flow of two embodiments.

Example of Second Embodiment: Face Recognition

According to the second embodiment, both the CPU and the neural network accelerator share a DDR. Thus, they can cooperate with each other to implement neural network.

For example, in a face recognition application, CPU can read images from a video camera, detect faces in the images, while the neural network accelerator can conduct face recognition. In this way, a neural network can be implemented in a portable device in an accelerated manner.

Referring to the example 2 shown in FIG. 9, wherein the CPU and the neural network accelerator work in a pipeline manner to process image 1, image 2, . . . image n. The CPU fetches image data, while the neural network accelerator processes the data. The above proposed solution supports a parallel schedule between the CPU and the neural network accelerator.

Table 1 illustrates a performance test made between a conventional CPU and the proposed embodiment of the present invention. In particular, the second embodiment combining a general CPU and the neural network accelerator.

TABLE 1

|  | op(MOP) | CPU only time (tk1, ms) | Second embodiment: CPU + Special processing unit time(ms) |
|---|---|---|---|
| Layer 1 | 7.9 | 5.34 | 0.99 |
| Layer 2 | 10.6 | 4.49 | 0.47 |
| Layer 3 | 21.2 | 7.86 | 0.65 |
| Layer 4 | 10.6 | 3.62 | 0.46 |
| Layer 5 | 15.9 | 5.09 | 0.55 |
| Layer 6 | 8.0 | 2.54 | 0.44 |
| Layer 7 | 10.6 | 3.32 | 0.58 |
| Layer 8 | 13.3 | 3.88 | 0.64 |
| Layer 9 | 6.6 | 2.14 | 0.67 |
| Total | 104.6 | 38.30 | 5.45 |

In Table 1, "op" represents operations. "MOP" represent million operations.

The general CPU used in the above test is Tegra k1 of NVIDIA. The second embodiment is implemented on Xilinx zynq 7020. It is found that our proposed solution has achieved significantly acceleration for each layer. Overall, we achieve a seven times faster implementation.

In summary, the present invention aims to exploit the functional flexibility of a CPU (e.g., a Tegra GPU) as well as a computational capability of a special neural network processing unit (e.g., a programmable FPGA). By combining advantages of both, it can implement a neural network for real-time application in an efficient way.

In addition, the general CPU shall be interpreted in the spirit of the invention. It is not limited to any specific type of CPU or GPU. For example, it might be a general ARM processor. The programmable logic can be a FPGA, or ASIC, etc.

It should be understood that FIGS. 2, 4, 6 are merely a functional overview of the hardware structure. The present invention is not limited to the above rigid division of processing system (PS) and programmable logic (PL).

For example, in practical implementations, according to one embodiment of the present invention, the CPU and the programmable logic are implemented by one System-On-a-Chip (SOC), for example, Xilinx Zynq SOC. The external memory is implemented by a separate memory chip, and being coupled to the SOC. However, as the external memory is controlled by CPU, it is easier to understand that both CPU and external memory consist of a processing system. Said external memory and CPU may communicate via a data & instruction bus.

In addition, in one embodiment, the DMA is also implemented on the same SOC. In one embodiment, under the control of CPU, DMA helps communication between the external memory and programmable logic. Thus, DMA can be considered as a part of the general processing module as well.

Those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:
1. A deep processing unit (DPU) for implementing an Artificial Neural Network (ANN), comprising:
 a central processing unit (CPU), configured for scheduling a programmable logic module and a direct memory access (DMA),
 the direct memory access (DMA), connected to the CPU, an external memory and the programmable logic module, used for communication between the external memory and the programmable logic module;
 the external memory, coupled to the CPU and the DMA, configured for storing instructions of the ANN and data to be processed by said ANN;
 the programmable logic module (PL), comprising:
  a controller, configured for getting instructions and scheduling operations of a computing complex on the basis of the instructions;
  a computing complex, including a plurality of processing elements (PEs), configured for performing operations on the basis of the instructions and data;
  a buffer, configured for preparing the data and instructions for the computing complex, wherein the CPU comprises a status monitoring module configured for monitoring a status of a Finite State Machine (FSM) of the controller in the programmable logic module and the CPU is configured to be notified of running errors in the PL through the status monitoring module and the status of the FSM;

an instruction first-in-first-out (FIFO) coupled between the controller of the PL and the DMA, wherein the CPU is configured to control the DMA to transmit instructions between the external memory and the programmable logic module, and the DMA is configured to transmit instructions between the external memory and the programmable logic module via the instruction FIFO, wherein the PL is configured to handle data transfer between the external memory and the PL, and the CPU is relieved from handling the data transfer between the external memory and the PL.

2. The DPU of claim 1, the PE further comprises:

a convolver complex, coupled to the buffer to receive weights of ANN and said data, configured for performing convolutional operations of the ANN;

adder tree, coupled to the convolver complex, configured for summing results of convolution operation;

non-linear (NL) module, coupled to the adder tree, configured for applying a non-linear function to the output of adder tree.

3. The DPU of claim 1, the PE further comprises:

pooling module, coupled to the NL module, configured for performing max-pooling operation on the output of NL module.

4. The DPU of claim 1, the buffer further comprises:

input buffer, configured for preparing the data, instructions for said convolver complex;

output buffer, for storing and outputting data results.

5. The DPU of claim 4, the buffer further comprises:

bias shift, coupled to the input buffer, configured for shifting weights of ANN between different numerical ranges and providing said shifted weights to the adder tree, wherein the weights are quantized fixed-point numbers.

6. The DPU of claim 1, wherein the CPU, the programmable logic module and the DMA are implemented in one single System-On-a-Chip (SOC).

7. The DPU of claim 6, wherein the external memory is implemented by a separate memory chip.

8. A deep processing unit (DPU) for implementing an Artificial Neural Network (ANN), comprising:

a central processing unit (CPU), configured for scheduling a programmable logic module and a direct memory access (DMA), the direct memory access (DMA), connected to the CPU, an external memory and the programmable logic module, used for communication between the external memory and the programmable logic module;

the external memory, coupled to the CPU, the DMA and a programmable logic module, configured for storing instructions of the ANN and data to be processed by said ANN;

the programmable logic module (PL), comprising:

a controller, configured for getting instructions and scheduling operations of a computing complex on the basis of the instructions;

a computing complex, including a plurality of processing elements (PEs), configured for performing operations on the basis of the instructions and data;

a buffer, configured for preparing the data and instructions for the computing complex, wherein the CPU comprises a status monitoring module configured for monitoring a status of a Finite State Machine (FSM) of the controller in the programmable logic module and the CPU is configured to be notified of running errors in the PL through the status monitoring module and the status of the FSM;

an instruction first-in-first-out (FIFO) coupled between the controller of the PL and the DMA, wherein the CPU is configured to control the DMA to transmit instructions between the external memory and the programmable logic module via the instruction FIFO; and wherein the external memory and the programmable logic module transmit data to each other directly and the CPU is relieved from handling data transfer between the external memory and the PL.

9. The DPU of claim 8, wherein the DMA is configured to transmit instructions between the external memory and the programmable logic module via FIFO.

10. The DPU of claim 8, the PE further comprises:

a convolver complex, coupled to the buffer to receive weights of ANN and said data, configured for performing convolutional operations of the ANN;

adder tree, coupled to the convolver complex, configured for summing results of convolution operation;

non-linear (NL) module, coupled to the adder tree, configured for applying a non-linear function to the output of adder tree.

11. The DPU of claim 8, the PE further comprises:

pooling module, coupled to the NL module, configured for performing max-pooling operation on the output of NL module.

12. The DPU of claim 8, the buffer further comprises:

input buffer, configured for preparing the data, instructions for said convolver complex;

output buffer, configured for storing and outputting data results.

13. The DPU of claim 12, the buffer further comprises:

bias shift, coupled to the input buffer, configured for shifting weights of ANN between different numerical ranges and providing said shifted weights to the adder tree, wherein the weights are quantized fixed-point numbers.

14. The DPU of claim 8, wherein the CPU, the programmable logic module and the DMA are implemented in one single System-On-a-Chip (SOC).

15. The DPU of claim 14, wherein the external memory is implemented by a separate memory chip.

16. A method for implementing an Artificial Neural Network (ANN), comprising:

providing a central processing unit (CPU) for scheduling a programmable logic module and a direct memory access (DMA), providing the direct memory access (DMA) connected to the CPU, an external memory and the programmable logic module, for communication between the external memory and the programmable logic module;

providing the external memory coupled to the CPU and the DMA, for storing instructions of the ANN and data to be processed by said ANN;

providing a programmable logic module (PL), comprising: a controller, configured for getting instructions and scheduling operations of a computing complex on the basis of the instructions; a computing complex, including a plurality of processing elements (PEs), configured for performing operations on the basis of the instructions and data; a buffer, configured for preparing the data and instructions for the computing complex, wherein the PL is configured to handle data transfer between the external memory and the PL, and the CPU is relieved from handling the data transfer between the external memory and the PL;

transmitting instructions between the external memory and the programmable logic module via DMA under the control of CPU, wherein the instructions are transmitted between the external memory and the programmable logic module via an instruction first-in-first-out (FIFO) coupled between the controller of the PL and the DMA;

monitoring a status of a Finite State Machine (FSM) of the controller in the programmable logic module by a status monitoring module in the CPU; and notifying the CPU of running errors in the PL through the status monitoring module and the status of the FSM.

17. A method for implementing an Artificial Neural Network (ANN), comprising:

providing a central processing unit (CPU) for scheduling a programmable logic module and a direct memory access (DMA), providing the direct memory access (DMA) coupled to the CPU, an external memory and the programmable logic module, for communication between the external memory and the programmable logic module;

providing an external memory coupled to the CPU, the DMA and a programmable logic module, for storing instructions of the ANN and data to be processed by said ANN;

providing a programmable logic module (PL), comprising: a controller, configured for getting instructions and scheduling operations of a computing complex on the basis of the instructions; a computing complex, including a plurality of processing elements (PEs), configured for performing operations on the basis of the instructions and data; a buffer, configured for preparing the data and instructions for the computing complex;

transmitting instructions between the external memory and the programmable logic module via DMA under the control of CPU and through an instruction first-in-first-out (FIFO) coupled between the controller of the PL and the DMA;

transmitting data between the external memory and the programmable logic module directly, wherein the CPU is relieved from handling data transfer between the external memory and the PL;

monitoring a status of a Finite State Machine (FSM) of the controller in the programmable logic module by a status monitoring module in the CPU; and notifying the CPU of running errors in the PL through the status monitoring module and the status of the FSM.

\* \* \* \* \*